Dec. 1, 1942.  J. J. SMITH  2,303,897
MULTIPLE GLAZED UNIT
Filed May 28, 1941

INVENTOR
JOHN J. SMITH

BY Olew E. Bee
ATTORNEY.

Patented Dec. 1, 1942

2,303,897

UNITED STATES PATENT OFFICE 2,303,897

MULTIPLE GLAZED UNIT

John J. Smith, Ford City, Pa., assignor to Pittsburgh Plate Glass Company, Allegheny County, Pa., a corporation of Pennsylvania Application May 28, 1941, Serial No. 395,546

2 Claims. (Cl. 20—56.5)

The present invention relates to insulating constructions and more particularly to a multiple glazed unit.

One object of the invention is the provision of a multiple glazed unit in which the inner chamber will remain substantially free of moisture.

A second object of the invention is to provide within a multiple glazed unit an auxiliary air chamber possessing a vapor pressure differential between that of the main air chamber of the unit and the surrounding atmosphere.

Other objects and advantages of the invention will become more apparent from the following detailed description of a preferred embodiment thereof.

The advent of air-conditioning to the building and transportation fields has occasioned the development of many types of multiple glass windows. The principal deficiency of these constructions resides in the practical impossibility of sealing the units in such manner that the infiltration of moisture is prevented. Generally desiccants are included in the units in order to maintain the enclosed air space substantially anhydrous. Ordinarily, however, the entire chamber intermediate the glass plates is desiccated and large quantities of dehydrating material are necessary to accomplish this purpose.

Briefly stated, the present invention contemplates the provision of an auxiliary chamber around the marginal portions of a multiple glazed unit, which chamber will act as a further barrier to the infiltration of moisture into the main chamber of the unit.

Figure 1:
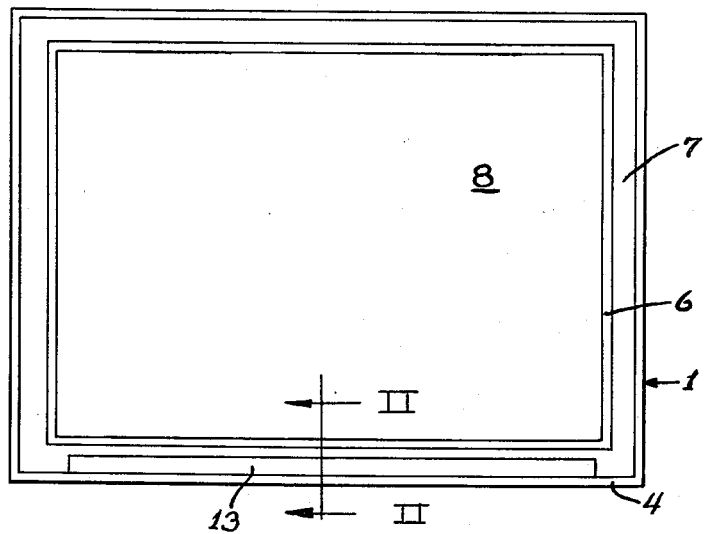
Figure 2:
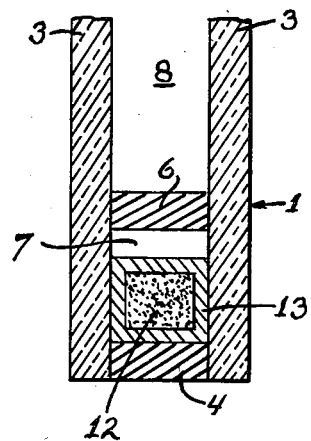

In the drawing, Figure 1 is an elevational view of a mu'.iple glazed unit embodying the principles of my invention, and Figure 2 is a fragmentary vertical sectional view taken along the line II—II of Fig. 1.

Referring to the drawing, a multiple glazed unit 1 comprises a plurality of glass plates 3 arranged in parallel relation, together with a spacer 4 of rubber, synthetic resin or metal positioned between and adhered to the glass plates 3 adjacent the margins thereof. A second spacer 6, which may be of the same composition as the spacer 4, is positioned between and adhered to the glass plates 3 and spaced inwardly from the spacer 4. The spacers may be of such composition that they will adhere directly to the glass plates or where this is not possible, as in the case of metal or glass, suitable adhesives may be employed to secure the spacers between the glass plates. It will be seen that this arrangement creates an intermediate chamber 7 and a main chamber 8 within the unit. A desiccating agent 12 such as activated alumina, anhydrous calcium sulfate, or the like, held within a suitable container 13, is disposed within the auxiliary chamber 7. If it is desired the chamber 8 may also be provided with a desiccant, although this is not essential.

Moisture vapor entering the unit through or around the spacer 4 will be absorbed by the desiccant 12 contained within the chamber 7. The small volume of the chamber 7 will enable it to be maintained at a low vapor pressure. Obviously, the pressure differential between the chamber 7 and the chamber 8 will be so small that there will be no tendency for moisture to penetrate through or around the spacer 6 into the chamber 8. It is likewise possible to control the vapor pressure differential of the chamber 7 and the surrounding atmosphere so that the tendency of moisture infiltration into the chamber 7 may be kept at a minimum. The space between the spacers 4 and 6 is not required to be large and accordingly the frame or other mounting means for securing the unit 1 to a wall or other supporting structure will cover the spacer 6 and there will be no impairment in the appearance of the complete assembly.

It will at once be apparent that various modifications in the nature and arrangement of the several elements of my construction are possible without departing from the spirit of the invention or the scope of the appended claims.

What I claim is:

1. A multiple glazed unit comprising a plurality of glass plates arranged in parallel relation, a spacer positioned between and adhered to the glass plates adjacent the margins thereof entirely around the peripheral portions of the plates, a second spacer positioned between and adhered to the glass plates and spaced inwardly from the first spacer throughout the extent of the latter, and means between the spacers for reducing the vapor pressure of the air contained between said spacers.

2. A multiple glazed unit comprising a plurality of glass plates arranged in parallel relation, a spacer positioned between and adhered to the glass plates adjacent the margins thereof entirely around the peripheral portions of the plates, a second spacer positioned between and adhered to the glass plates and spaced inwardly from the first spacer throughout the extent of the latter, and a desiccant disposed between said spacers.

JOHN J. SMITH.